United States Patent
Lee et al.

(10) Patent No.: US 12,045,238 B2
(45) Date of Patent: Jul. 23, 2024

(54) METHOD AND APPARATUS FOR DIGITAL TWIN FEDERATION

(71) Applicant: ELECTRONICS AND TELECOMMUNICATIONS RESEARCH INSTITUTE, Daejeon (KR)

(72) Inventors: Hyun Jeong Lee, Daejeon (KR); Yong-Woon Kim, Daejeon (KR); Sangkeun Yoo, Daejeon (KR); Changkyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 17/859,830

(22) Filed: Jul. 7, 2022

(65) Prior Publication Data

US 2023/0010177 A1    Jan. 12, 2023

(30) Foreign Application Priority Data

Jul. 7, 2021 (KR) .................... 10-2021-0089288
Jun. 8, 2022 (KR) .................... 10-2022-0069688

(51) Int. Cl.
*G06F 16/2455* (2019.01)

(52) U.S. Cl.
CPC .............. *G06F 16/2455* (2019.01)

(58) Field of Classification Search
CPC ..... G06F 16/2455; H04L 45/02; G06Q 10/20; G06Q 10/067
USPC .................................................... 707/769
See application file for complete search history.

(56) References Cited

U.S. PATENT DOCUMENTS

| | | | |
|---|---|---|---|
| 10,762,475 B2 | 9/2020 | Song et al. | |
| 11,216,261 B1* | 1/2022 | Moyal | G06F 9/455 |
| 11,463,322 B1* | 10/2022 | Sha | H04L 41/122 |
| 11,561,535 B2* | 1/2023 | Mehrotra | G05B 19/0426 |
| 11,651,119 B2* | 5/2023 | Karri | G06F 30/20 |
| | | | 703/9 |
| 2012/0317096 A1* | 12/2012 | Kaufmann | G06F 16/24534 |
| | | | 707/718 |
| 2017/0286572 A1* | 10/2017 | Hershey | B64F 5/60 |
| 2018/0239342 A1 | 8/2018 | Jeon et al. | |
| 2019/0138333 A1* | 5/2019 | Deutsch | G06Q 10/0631 |
| 2019/0138662 A1* | 5/2019 | Deutsch | G06F 30/00 |
| 2019/0138970 A1* | 5/2019 | Deutsch | G06F 9/542 |
| 2019/0251575 A1* | 8/2019 | Berti | G06Q 30/018 |
| 2019/0354922 A1* | 11/2019 | Berti | G06K 7/1417 |

(Continued)

OTHER PUBLICATIONS

Yong-Woon Kim et al., "Characterization of Digital Twin," ResearchGate, Jun. 7, 2021, pp. 1-105, https://www.researchgate.net/publication/348356334.

*Primary Examiner* — Hanh B Thai
(74) *Attorney, Agent, or Firm* — Rabin & Berdo, P.C.

(57) ABSTRACT

A method for a digital twin federation is provided. The method for a digital twin federation includes: transmitting, by a first digital twin, a connection request including digital twin information for the digital twin federation to a connection broker; receiving, by the first digital twin, connection information of a second digital twin having the digital twin information for the digital twin federation from the connection broker; and performing, by the first digital twin, connection establishment with the second digital twin using connection information of the second digital twin.

5 Claims, 9 Drawing Sheets

(56) References Cited

U.S. PATENT DOCUMENTS

| | | | |
|---|---|---|---|
| 2020/0050163 A1* | 2/2020 | Ludwig | G05B 19/056 |
| 2020/0150637 A1* | 5/2020 | Yates | G05B 19/41885 |
| 2020/0183717 A1* | 6/2020 | Deutsch | G06F 30/20 |
| 2020/0250683 A1* | 8/2020 | Padmanabhan | G06Q 20/38215 |
| 2020/0333795 A1 | 10/2020 | Jang | |
| 2020/0387576 A1* | 12/2020 | Brett | G06F 3/04815 |
| 2021/0034714 A1* | 2/2021 | Jackson | G06Q 50/184 |
| 2021/0117716 A1* | 4/2021 | Lapointe | G06V 10/7715 |
| 2021/0208576 A1* | 7/2021 | Muenzel | G06K 19/06037 |
| 2021/0306416 A1* | 9/2021 | Mukhopadhyay | H04L 41/12 |
| 2022/0121886 A1* | 4/2022 | Jahjah | G06F 18/24155 |
| 2022/0121965 A1* | 4/2022 | Chatterji | G06F 16/23 |
| 2022/0156665 A1* | 5/2022 | Beth | G05D 1/0276 |
| 2022/0258752 A1* | 8/2022 | Kim | B60W 50/06 |
| 2022/0269595 A1* | 8/2022 | Tritchkov | G06F 11/3696 |
| 2023/0130245 A1* | 4/2023 | Sha | G10L 21/0232 |
| | | | 704/226 |
| 2023/0213909 A1* | 7/2023 | Galvez | G05B 15/02 |
| | | | 700/28 |

\* cited by examiner

METHOD AND APPARATUS FOR DIGITAL TWIN FEDERATION

CROSS-REFERENCE TO RELATED APPLICATION

This application claims priority to and the benefit of Korean Patent Application Nos. 10-2021-0089288 and 10-2022-0069688 filed in the Korean Intellectual Property Office on Jul. 7, 2021 and Jun. 8, 2022, the entire contents of which are incorporated herein by reference.

BACKGROUND OF THE INVENTION

(a) Field of the Invention

The present disclosure relates to a method and apparatus for digital twin federation, and more particularly, to a method and apparatus for digital twin federation capable of expanding digital twin functions and services or providing new services through federation between digital twins.

(b) Description of the Related Art

Digital twins are being used in each domain such as manufacturing, city, home, energy, and medical fields, but it is difficult to identify which digital twin functions and services exist.

And when providing new digital twin functions and services, inconvenience and cost loss will inevitably occur to develop new digital twin functions and services from the beginning.

In addition, complex problems such as greenhouse gas emission management and infectious disease management are related to several domains such as manufacturing, city, home, energy, and medical. Since the federation or interworking among digital twins in different domains is not considered, it is difficult to resolve these problems by individual digital twin.

SUMMARY OF THE INVENTION

The present disclosure has been made in an effort to provide a method and apparatus for digital twin federation capable of easily searching and utilizing digital twin information, functions and services, and configuring a new service by federating two or more digital twins.

According to an exemplary embodiment, a method for a digital twin federation is provided. The method for a digital twin federation includes: transmitting, by a first digital twin, a connection request including digital twin information for the digital twin federation to a connection broker; receiving, by the first digital twin, connection information of a second digital twin having the digital twin information for the digital twin federation from the connection broker; and performing, by the first digital twin, connection establishment with the second digital twin using connection information of the second digital twin.

The method for a digital twin federation may further comprising registering, by the first digital twin, connection information of the first digital twin to the connection broker.

The method for a digital twin federation may further comprising registering, by the first digital twin, digital twin information including functions and services of the first digital twin in a registry.

The transmitting includes: requesting to the registry for searching digital twin information for digital twin federation; and receiving an information search result including digital twin information searched for the digital twin federation from the registry.

The method for a digital twin federation may further comprising providing, by the first digital twin, a service through information exchange with the second digital twin.

The method for a digital twin federation may further comprising: searching digital twin information to be used from the registry; and changing or expanding digital twin functions and services or providing new services using the searched digital twin information.

The method for digital twin federation may be performed by a generative AI (Artificial Intelligence) or an autonomous system.

According to another embodiment, an apparatus for a digital twin federation for a first digital twin to federate with another digital twin is provided. The apparatus for a digital twin federation includes: a searcher that accesses a registry and searches other digital twins with the function or service to be federated; a connector that accesses a connection broker and receives connection information of the other digital twins with the function or service to be federated, and establishes a connection with the other digital twins; and a service provider that provides digital twin functions and services through information exchange with the connected other digital twins.

The apparatus for a digital twin federation may further include a registry that registers the functions and services of the first digital twin in the registry, the connector may register the connection information of the first digital twin to the connection broker.

The searcher may access the registry and search for a digital twin function or service to be used, and the apparatus for a digital twin federation may further include a manager that changing or expanding digital twin functions and services or providing new services using the searched digital twin information.

DETAILED DESCRIPTION OF THE EMBODIMENTS

Figure 1:
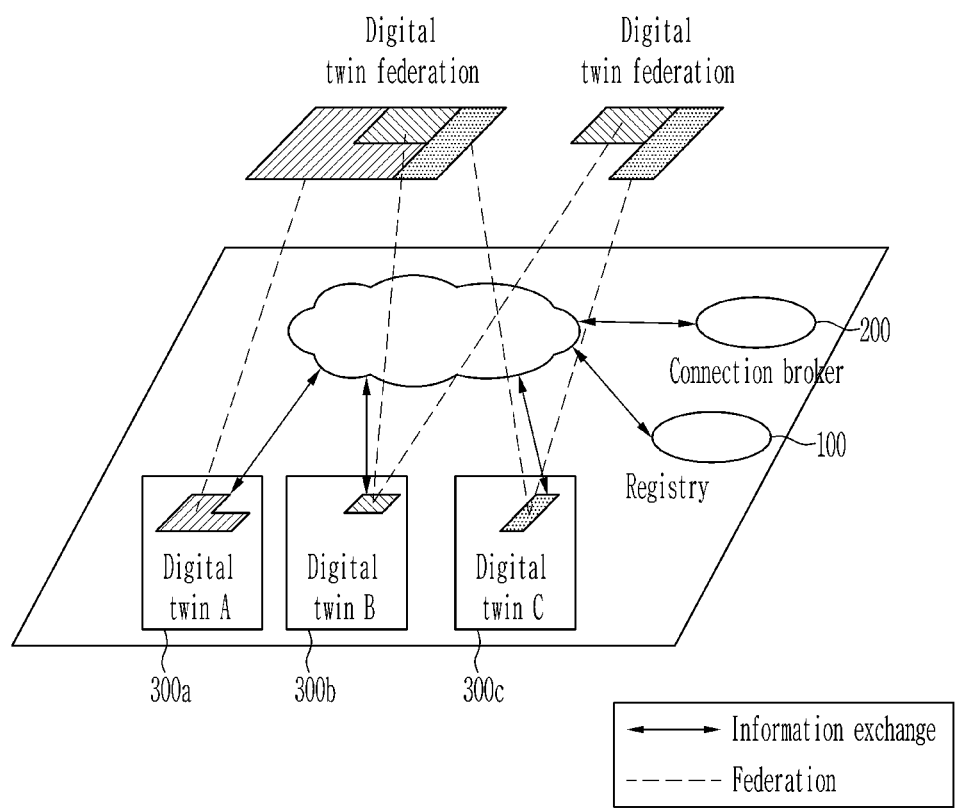
FIG. 1 is a diagram for explaining the concept of federation between digital twin systems.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

In this specification, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may also be referred to as a first element.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus for digital twin federation according to an embodiment of the present disclosure will be described in detail with reference to the drawings.

FIG. 1 is a diagram for explaining the concept of federation between digital twin systems.

Referring to FIG. 1, each digital twin system 300a, 300b, and 300c generates an observable object of a corresponding domain as a digital twin A, a digital twin B, and a digital twin C in a virtual space, respectively. A digital twin is a digital object that reflects the basic properties of an observable object. It can perform monitoring and control functions by connecting to the real world as well as the basic functions of the observable object, and can perform simulation functions by applying AI (Artificial Intelligence), etc. The digital twin systems 300a, 300b, and 300c register digital twin functions and services of digital twin A, digital twin B, and digital twin C, respectively, in the registry 100.

The registry 100 stores digital twin functions and services.

The connection broker 200 connects two or more digital twin systems for federation functions between digital twins. For example, the connection broker 200 connects the digital twin systems 300a, 300b, and 300c for digital twin federation between digital twin A, digital twin B, and digital twin C. Also, the connection broker 200 may connect digital twin system B and digital twin system C 300b, and 300c for digital twin federation between digital twin B and digital twin C. The connection broker 200 may exchange connection information between digital twin systems to connect two or more digital twin systems.

In digital twin federation, there can be a leader-member model and a peer-to-peer model. The leader-member model is a model in which a leader who starts a federation and members participating in the federation for a common goal exist, for example, in the leader-member model, the leader may be the central disaster safety countermeasure headquarter and the member may be the local disaster management organizations. The peer-to-peer model is a model in which members can start a federation from an equal position and share data with each other for a common goal, and various types of digital twins, such as between cities, between companies, and between groups, can be federated for their respective services. The peer-to-peer implementation method includes a hybrid peer-to-peer method, a pure peer-to-peer method, and a super peer method.

Figure 2:
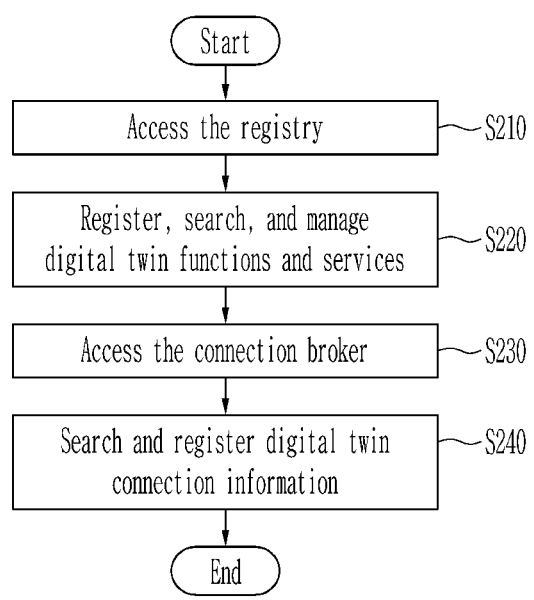
FIG. 2 is a diagram illustrating a registration procedure of a digital twin function and service according to an embodiment.

FIG. 2 is a diagram illustrating a registration procedure of a digital twin function and service according to an embodiment.

Referring to FIG. 2, a digital twin user accesses the registry (S210). Here, the digital twin user may mean a digital twin service developer, a digital twin service provider, and a digital twin service user, and may also mean a digital twin system.

The digital twin user can register digital twin functions and services to the registry 100, search for digital twin functions and services from the registry 100, and manage digital twin functions and services, such as developing, modifying and deleting digital twin functions and services (S220). After searching digital twin functions and services, the digital twin user can change or expand existing digital twin functions and services, change or expand existing services, and develop new services using two or more digital twin functions and services. The digital twin user registers the changed digital twin functions and services and the new digital twin services in the registry 100.

The digital twin user accesses the connection broker 200 (S230), and searches digital twin connection information from the connection broker 200, registers the digital twin connection information to the connection broker 200, and manages digital twin connection information (S240).

Figure 3:
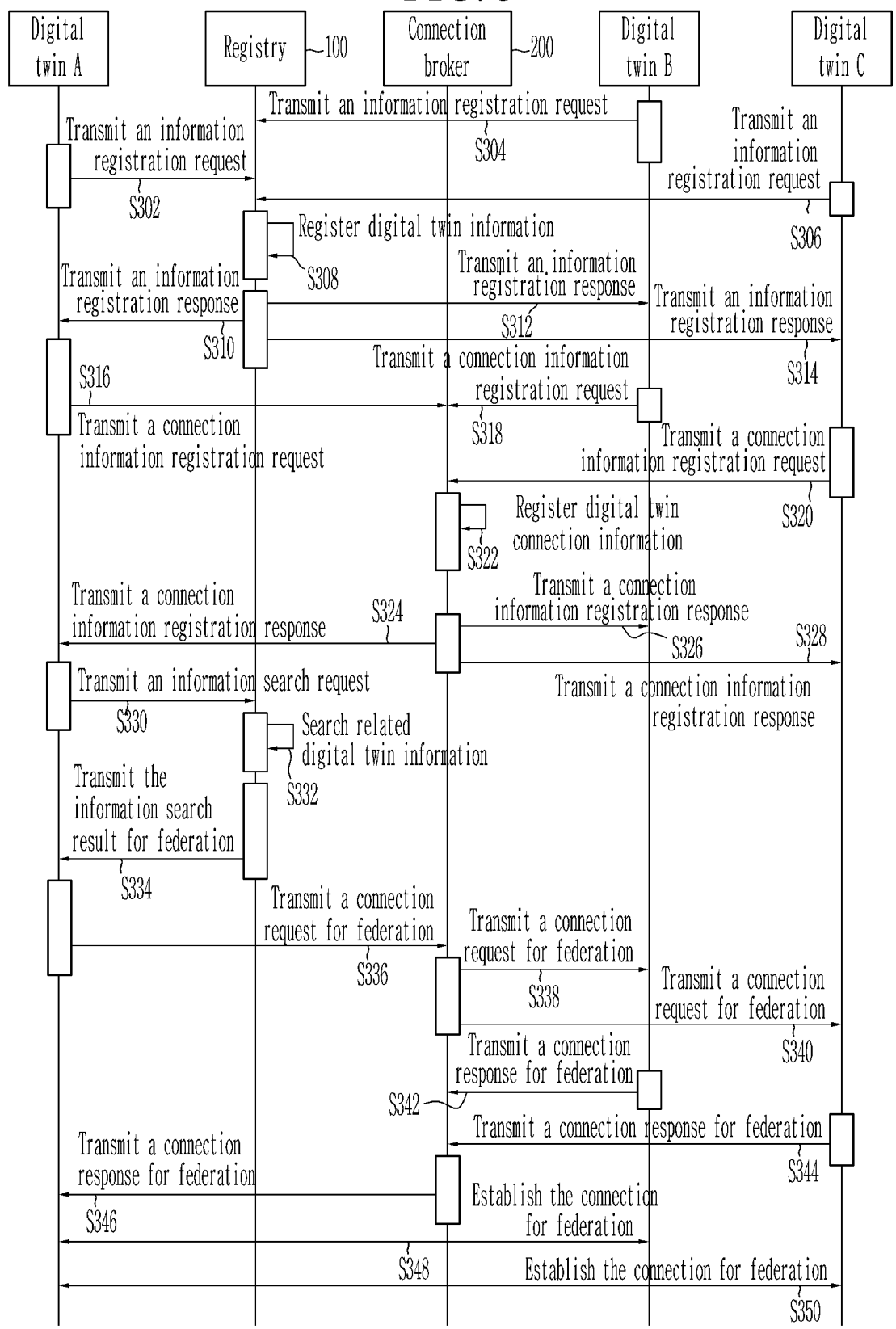
FIG. 3 is a diagram illustrating information registration and connection establishment procedures for digital twin federation according to an embodiment.

FIG. 3 is a diagram illustrating information registration and connection establishment procedures for digital twin federation according to an embodiment.

Referring to FIG. 3, digital twin A, digital twin B, and digital twin C transmit information registration requests including digital twin information such as digital twin functions and characteristics and services to the registry 100, respectively (S302, S304, and S306).

The registry 100 registers digital twin information received from digital twin A, digital twin B, and digital twin C (S308), and transmits information registration responses to information registration requests to digital twin A, digital twin B, and digital twin C, respectively (S310, S312, and S314).

The digital twin A, digital twin B, and digital twin C transmit a connection information registration request including their digital twin connection information to the connection broker 200, respectively (S316, S318, and S320).

The connection broker 200 registers the digital twin connection information received from digital twin A, digital twin B, and digital twin C, respectively (S322), and transmits a connection information registration response to digital twin A, digital twin B, and digital twin C (S324, S326, and S328).

The digital twin A transmits an information search request including information such as digital twin function for digital twin federation to the registry 100 (S330).

The registry 100 searches related digital twin information according to the information search request of digital twin A (S332).

The registry 100 transmits the information search result for the information search request of the digital twin A (S334). For example, the registry 100 may transmit an information search result including digital twin information of the searched digital twin B and digital twin C.

The digital twin A transmits a connection request to the connection broker 200 for federation with digital twin B and digital twin C (S336). At this time, digital twin A may transmit a connection request including digital twin connection information of digital twin B and digital twin C to the broker 200.

The connection broker 200 transmits a connection request for federation with digital twin A to digital twin B and digital twin C (S338, and S340). The digital twin B and digital twin C transmit a connection response to the connection request for federation with digital twin A to the connection broker 200 (S342, and S344). The connection response may include connection acceptance or connection rejection.

The connection broker 200 transmits a connection response to the connection request for federation with digital twin B and digital twin C to digital twin A (S346). The connection broker 200 may include the connection acceptance or connection rejection information of the digital twin B and the digital twin C in the connection response, and in the case of connection acceptance, the connection information of the corresponding digital twin may be included in the connection response.

When digital twin B and digital twin C both accept the connection, digital twin A perform the connection establishment procedure for federation to digital twin B and digital twin C based on the connection information of digital twin B and digital twin C (S348, and S350).

Through the connection establishment procedure between digital twin A, digital twin B, and digital twin C, connection establishment for the federation between digital twin A, digital twin B, and digital twin C is completed.

The connection for the federation between digital twins, such as digital twin A and digital twin B, and digital twin A and digital twin C, means that they can communicate with each other, and can be directly connected or connected through the connection broker 200.

Figure 4:
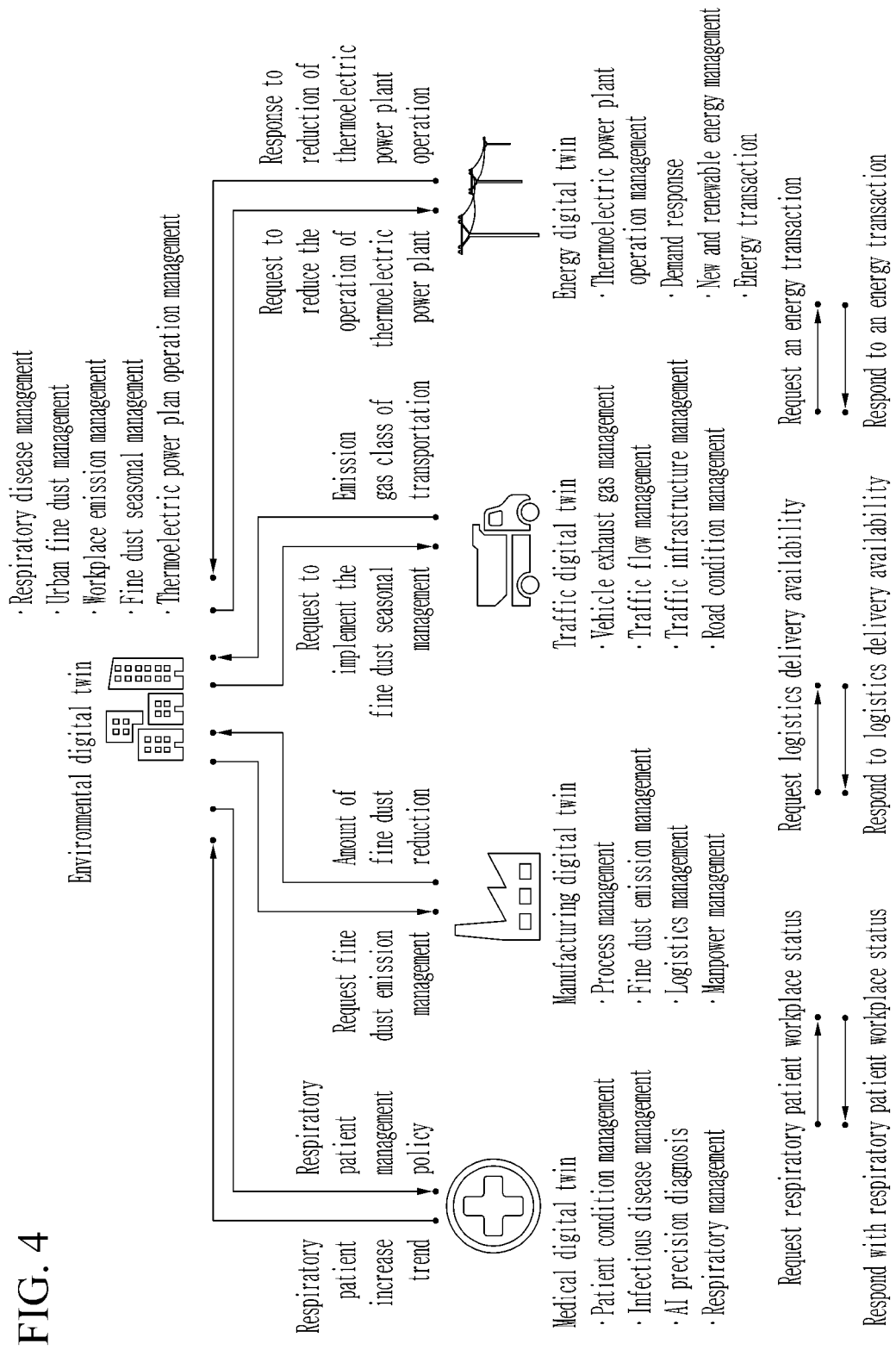
FIG. 4 is a diagram illustrating an example of an environment management service based on a digital twin federation according to an embodiment.
Figure 5:
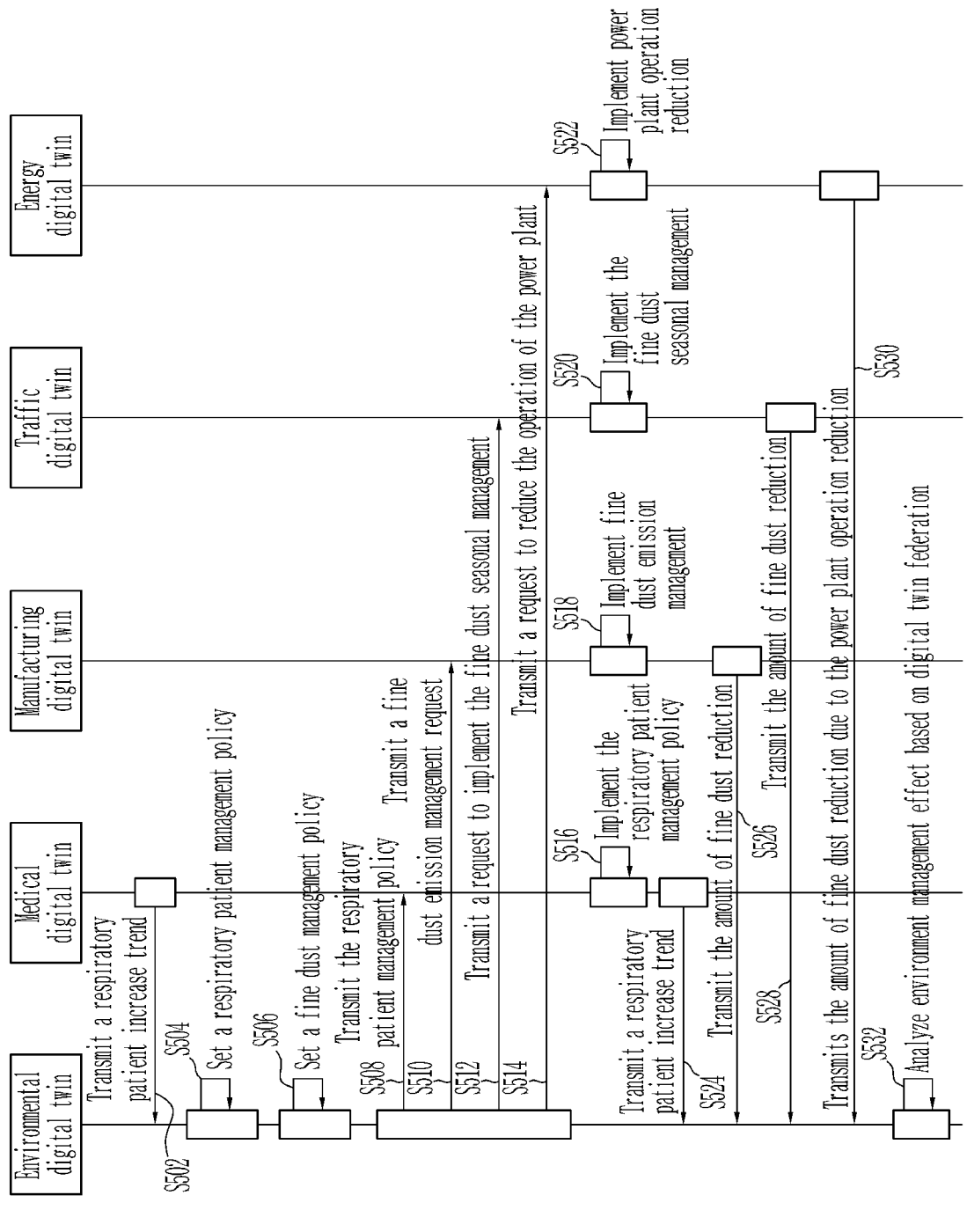
FIG. 5 is a diagram illustrating a digital twin federation procedure for the environment management service shown in FIG. 4.

FIG. 4 is a diagram illustrating an example of an environment management service based on a digital twin federation according to an embodiment, and FIG. 5 is a diagram illustrating a digital twin federation procedure for the environment management service shown in FIG. 4.

Referring to FIG. 4, the medical digital twin provides functions and services such as patient condition management, infectious disease management, AI precision diagnosis, and respiratory management, and exchanges information through connection establishment for federation with the environmental digital twin.

The manufacturing digital twin provides functions and services such as process management, fine dust emission management, logistics management, and manpower management, and exchanges information through connection establishment for federation with the environmental digital twin.

The traffic digital twin provides functions and services such as vehicle exhaust gas management, traffic flow management, traffic infrastructure management, and road condition management, and exchanges information through connection establishment for federation with the environmental digital twin.

The energy digital twin provides functions and services such as thermoelectric power plan operation management, demand response, new and renewable energy management, and energy transaction, and exchanges information through connection establishment for federation with the environmental digital twin.

The environmental digital twin provides environmental management service such as respiratory disease management, urban fine dust management, workplace emission management, fine dust seasonal management, and thermoelectric power plan operation management, by federation with the medical digital twin, manufacturing digital twin, traffic digital twin, and energy digital twin.

In this case, in digital twin federation, it can have a leader-member model structure. The environmental digital twin will act as a leader, and the medical digital twin, manufacturing digital twin, traffic digital twin, and energy digital twin may be members.

Additionally, information can be exchanged by establishing a connection between two or more digital twins, such as between the medical digital twin and the manufacturing digital twin, between the manufacturing digital twin and the traffic digital twin, and between the transportation digital twin and the energy digital twin. For example, the medical digital twin may request a respiratory patient workplace status to the manufacturing digital twin, and the manufacturing digital twin may respond with a respiratory patient workplace status. The manufacturing digital twin can request logistics delivery availability to the traffic digital twin, and the traffic digital twin can respond to logistics delivery availability. In addition, a traffic digital twin can request an energy transaction to the energy digital twin, and the energy digital twin can respond to an energy transaction.

Referring to FIG. 5, the medical digital twin transmits a respiratory patient increase trend to the environmental digital twin (S502).

The environmental digital twin sets a respiratory patient management policy based on the respiratory patient increase trend (S504).

The environmental digital twin sets a fine dust management policy for an environmental management service (S506).

The environmental digital twin transmits the respiratory patient management policy to the medical digital twin (S508).

The environmental digital twin transmits a fine dust emission management request according to the fine dust management policy to the manufacturing digital twin (S510).

The environmental digital twin transmits a request to implement the fine dust seasonal management according to the fine dust management policy to the transportation digital twin (S512).

The environmental digital twin transmits a request to reduce the operation of the power plant for the environmental management service to the energy digital twin (S514).

The medical digital twin implements the respiratory patient management policy of the environmental digital twin (S516).

The manufacturing digital twin implements fine dust emission management according to the fine dust emission management request of the environmental digital twin (S518).

The traffic digital twin implements the fine dust seasonal management according to the request for implementing the fine dust seasonal management of the environmental digital twin (S520).

The energy digital twin implements power plant operation reduction according to the request to reduce the operation of the power plant of the environmental digital twin (S522).

The medical digital twin transmits a respiratory patient increase trend according to the implementation of the respiratory patient management policy to the environmental digital twin (S524).

The manufacturing digital twin transmits the amount of fine dust reduction according to the implementation of fine dust emission management to the environmental digital twin (S526).

The traffic digital twin transmits the amount of fine dust reduction as a result of the implementation of the fine dust seasonal management to the environmental digital twin (S528).

The energy digital twin transmits the amount of fine dust reduction due to the power plant operation reduction to the environmental digital twin (S530).

The environmental digital twin analyzes environment management effect based on digital twin federation using the respiratory patient increase trend according to the implementation of the respiratory patient management policy, the amount of fine dust reduction according to the implementation of fine dust emission management, the amount of fine dust reduction as a result of the implementation of the fine dust seasonal management, and the amount of fine dust reduction due to the reduction in power plant operation (S532).

The environmental digital twin can periodically receive the respiratory patient increase trend from the medical digital twin and analyze the correlation with the number of respiratory patients according to fine dust emissions, and analyze environmental management effects such as reduction of fine dust according to the digital twin federation through periodic information exchange between the medical digital twin, the manufacturing digital twin, the traffic digital twin, and the energy digital twin.

Figure 6:
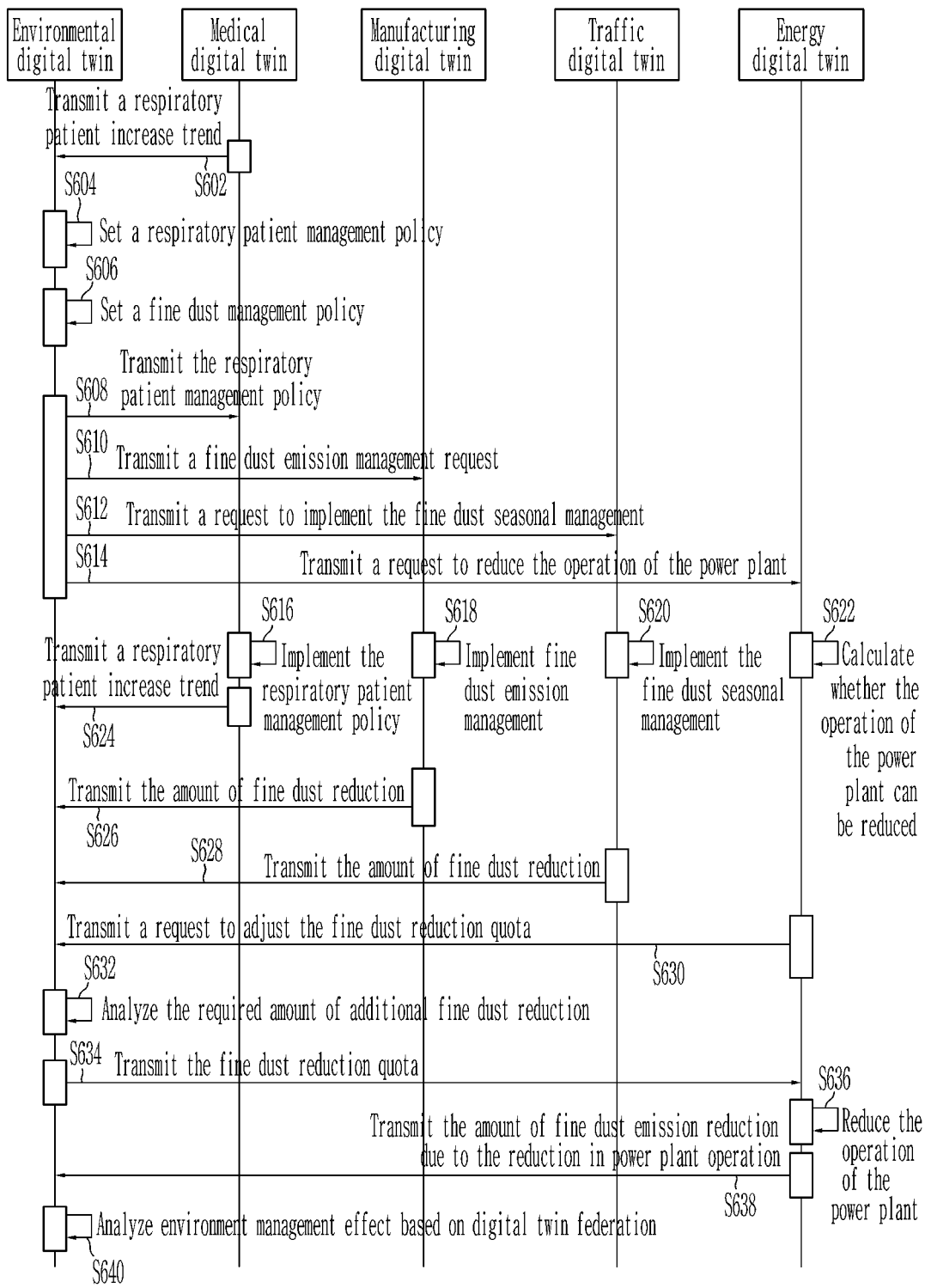
FIG. 6 is a diagram additionally illustrating a procedure for adjusting the fine dust reduction quota in the environment management service based on a digital twin federation shown in FIG. 5.

FIG. 6 is a diagram additionally illustrating a procedure for adjusting the fine dust reduction quota in the environment management service based on a digital twin federation shown in FIG. 5.

Referring to FIG. 6, steps (S602 to S620, S624, S626, and S628) are the same as steps (S502 to S520, S524, S526 and S528) described in FIG. 5.

Meanwhile, when the energy digital twin receives a request to reduce the operation of the power plant from the environmental digital twin, it calculates whether the operation of the power plant can be reduced (S622), and transmits a request to adjust the fine dust reduction quota to the environmental digital twin (S630).

When the environmental digital twin receives a request to adjust the fine dust reduction quota from the energy digital twin, it analyzes the required amount of additional fine dust reduction based on the amount of fine dust reduction received from the manufacturing digital twin and the traffic digital twin (S632).

The environmental digital twin transmits the fine dust reduction quota to the energy digital twin based on the analysis result of the required amount of additional fine dust reduction (S634).

The energy digital twin reduces the operation of the power plant to meet the fine dust reduction quota (S636).

The energy digital twin transmits the amount of fine dust emission reduction due to the reduction in power plant operation to the environmental digital twin (S638).

The environmental digital twin analyzes environment management effect based on digital twin federation using the respiratory patient increase trend according to the implementation of the respiratory patient management policy, the amount of fine dust reduction according to the implementation of fine dust emission management, the amount of fine dust reduction as a result of the implementation of the fine dust seasonal management, and the amount of fine dust reduction due to the reduction in power plant operation (S640).

Figure 7:
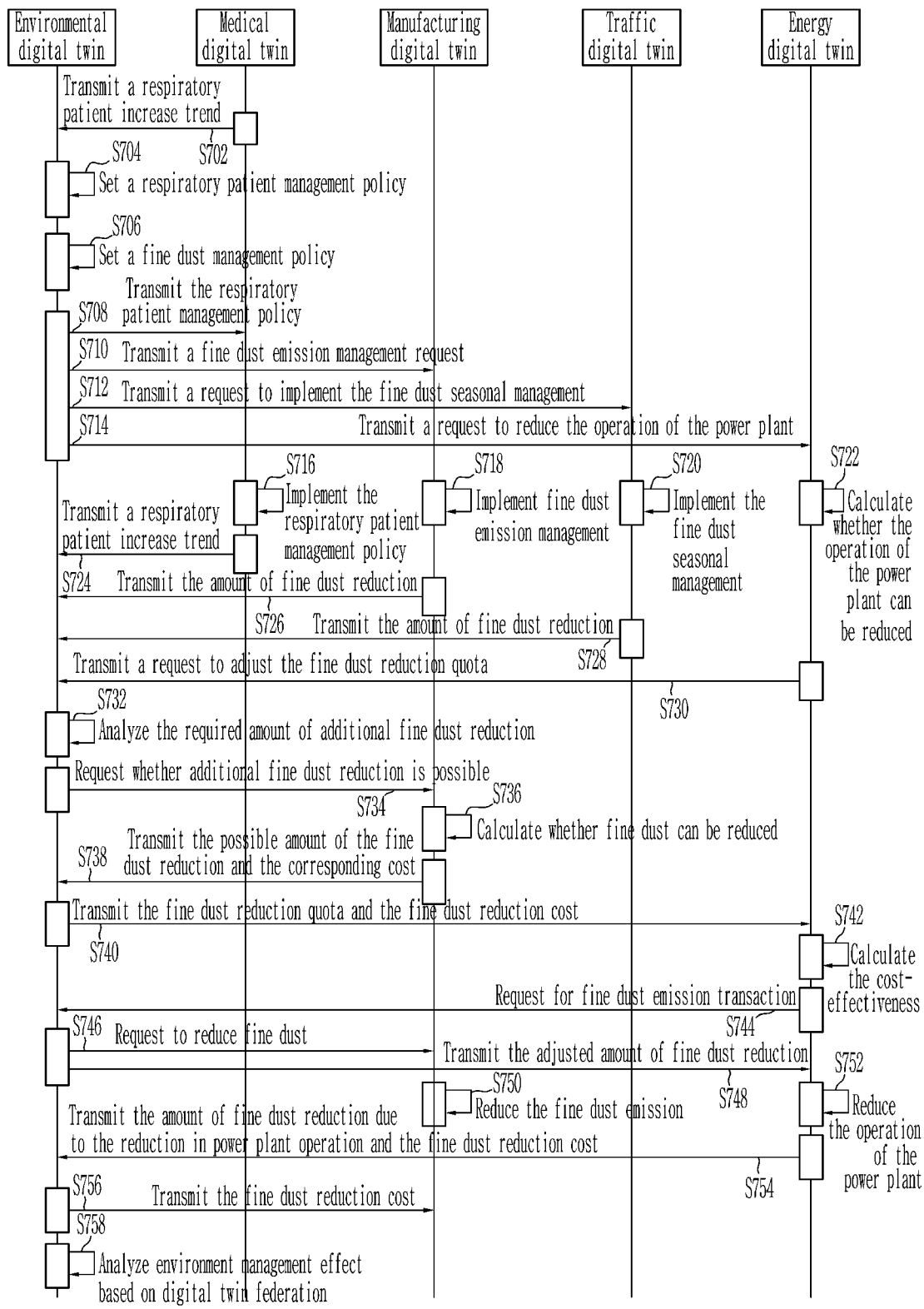
FIG. 7 is a diagram additionally illustrating a procedure for trading fine dust emissions in the environment management service based on a digital twin federation shown in FIG. 6.

FIG. 7 is a diagram additionally illustrating a procedure for trading fine dust emissions in the environment management service based on a digital twin federation shown in FIG. 6.

The fine dust emission transaction can be conducted in the environmental digital twin or separately in the fine dust emission trading system.

Referring to FIG. 7, steps (S702 to S732) are the same as steps (S602 to S632) described with reference to FIG. 6.

When the environmental digital twin receives a request to adjust the fine dust reduction quota from the energy digital twin, it requests whether additional fine dust reduction is possible in the manufacturing digital twin (S734).

When the manufacturing digital twin receives a request for whether additional fine dust reduction is possible from the environmental digital twin, it calculates whether fine dust can be reduced (S736), and transmits the possible amount of the fine dust reduction and the corresponding cost to the environmental digital twin (S738).

The environmental digital twin determines the fine dust reduction quota of the energy digital twin based on the possible amount of the fine dust reduction and the corresponding cost received from the manufacturing digital twin, and transmits the fine dust reduction quota of the energy digital twin and the fine dust reduction cost of the manufacturing digital twin to the energy digital twin (S740).

The energy digital twin calculates the cost-effectiveness by calculating the cost of power plant operation reduction and the transaction cost of fine dust emission according to the fine dust reduction quota (S742).

The energy digital twin determines the fine dust emission transaction based on cost effectiveness, and requests to fine dust emission transaction to the environmental digital twin (S744).

When the environmental digital twin receives the fine dust emission transaction request, it requests the manufacturing digital twin to reduce fine dust according to the fine dust emission transaction (S746), and transmits the adjusted amount of fine dust reduction to the energy digital twin (S748).

The manufacturing digital twin reduces the fine dust emission according to the fine dust reduction request (S750).

The energy digital twin reduces the operation of the power plant to meet the adjusted fine dust reduction (S752). At this time, if the amount of fine dust reduction traded with the manufacturing digital twin is sufficient, there is no need to reduce the operation of the power plant.

The energy digital twin transmits the amount of fine dust reduction due to the reduction in power plant operation and the fine dust reduction cost for the manufacturing digital twin to the environmental digital twin (S754).

The environmental digital twin transmits the fine dust reduction cost to the manufacturing digital twin (S756).

The environmental digital twin performs an environmental management effect analysis based on the digital twin federation (S758).

In this way, the environmental digital twin can be federated with the medical digital twin, the manufacturing digital twin, the traffic digital twin and the energy digital twin to provide environmental management services, and the environmental management effect based on the digital twin federation can be quickly analyzed.

Figure 8:
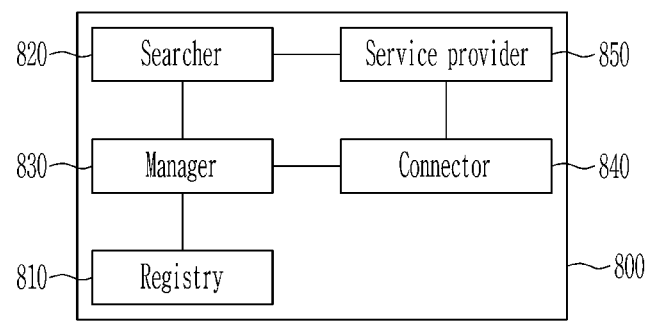
FIG. 8 is a diagram illustrating an apparatus for digital twin federation according to an embodiment.

FIG. 8 is a diagram illustrating an apparatus for digital twin federation according to an embodiment.

Referring to FIG. 8, the apparatus for digital twin federation 800 includes a registry 810, a searcher 820, a manager 830, a connector 840, and a service provider 850. The apparatus for digital twin federation 800 may be implemented in a digital twin system, may be implemented in a digital twin, or may be implemented through a device separate from the digital twin system.

The registry 810 accesses the registry to register digital twin functions and services.

The searcher 820 accesses the registry, requests a search for a desired digital twin function and service, and receives digital twin information having the digital twin functions and services searched from the registry.

The manager 830 manages digital twin functions and services. The manager 830 may change and extend digital twin functions and services by using the searched digital twin functions and services. The manager 830 may create a new service by using the searched digital twin functions and services.

The connector 840 may access the connection broker 200 to register digital twin connection information, receive digital twin connection information to be federated from the connection broker 200, and establish a connection with another digital twin using the digital twin connection information to be federated.

The service provider 850 provides digital twin functions and services through information exchange between digital twins federated through the connector 840.

Figure 9:
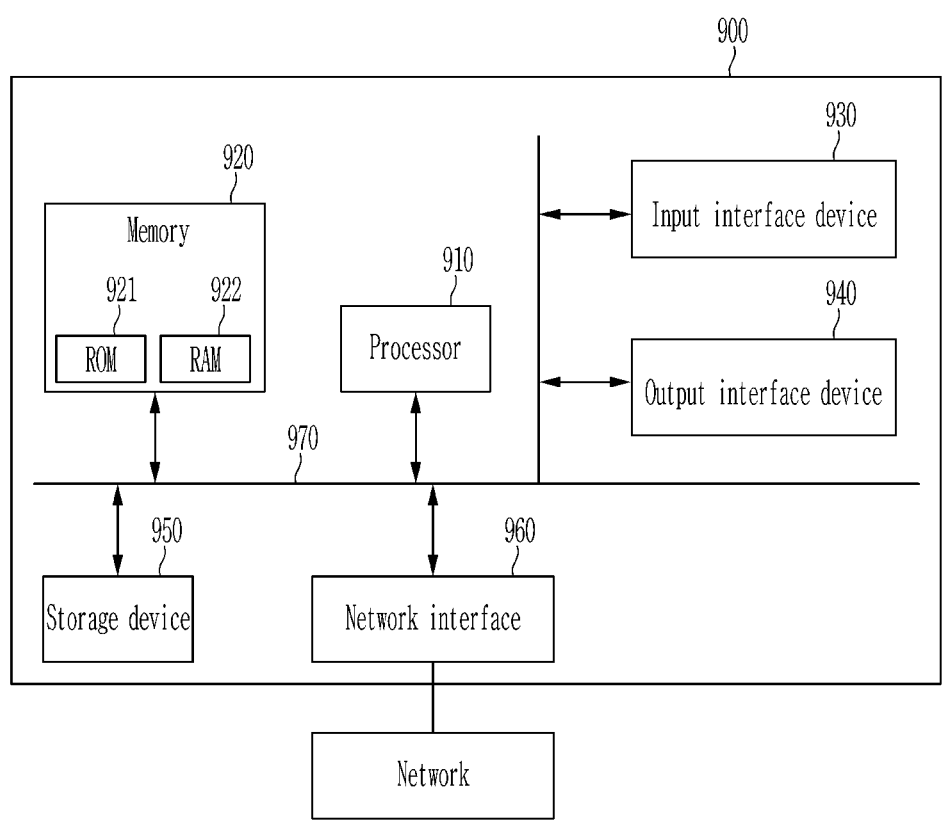
FIG. 9 is a diagram illustrating an apparatus for digital twin federation according to another embodiment.

FIG. 9 is a diagram illustrating an apparatus for digital twin federation according to another embodiment.

Referring to FIG. 9, the apparatus for digital twin federation 900 may represent a computing device in which the method for digital twin federation described above is implemented.

The apparatus for digital twin federation 900 may include at least one of a processor 910, a memory 920, an input interface device 930, an output interface device 940, a storage device 950, and a network interface device 960. Each of the components may be connected by a common bus 970 to communicate with each other. In addition, each of the components may be connected through an individual interface or a separate bus centering on the processor 910 instead of the common bus 970.

The processor 910 may be implemented as various types such as an application processor (AP), a central processing unit (CPU), a graphics processing unit (GPU), etc., and may be any semiconductor device that executes a command stored in the memory 920 or the storage device 950. The processor 210 may execute a program command stored in at least one of the memory 920 and the storage device 950. The processor 910 stores program command for implementing at least some functions of the registry 810, the searcher 820, the manager 830, the connector 840, and the service provider 850 described with reference to FIG. 8 in the memory 920, and may control to perform the operation described with reference to FIGS. 1 to 8.

The memory 920 and the storage device 950 may include various types of volatile or non-volatile storage media. For example, the memory 920 may include a read-only memory (ROM) 921 and a random access memory (RAM) 922. The memory 920 may be located inside or outside the processor 910, and the memory 920 may be connected to the processor 910 through various known means.

The input interface device 930 is configured to provide data to the processor 910. For example, the input interface device 930 may provide the received digital twin function and service information to the processor 910.

The output interface device 940 is configured to output data from the processor 910. For example, the output interface device 940 may output the digital twin function and service generated or changed by the processor 910.

The network interface device 960 may transmit or receive signals with another device, for example, a registry (100 of FIG. 1) or a connection broker (200 of FIG. 1) through a wired network or a wireless network.

The method for digital twin federation according to an embodiment of the present disclosure may be implemented by a generative AI or an autonomic system. In other words, the generative AI or the autonomic system can recognize the environment, situation and state by itself, can perform management of the digital twin functions and services such as generation, change and deletion of digital twin functions and services based on the recognition results, and can performs digital twin federation function.

At least some of the method for digital twin federation according to an embodiment of the present disclosure may be implemented as a program or software executed in a computing device, and the program or software may be stored in a computer-readable medium.

In addition, at least some of the method for digital twin federation according to an embodiment of the present disclosure may be implemented as hardware capable of being electrically connected to a computing device.

According to the embodiment, by providing functions to registry, search, and manage (modify, and delete) digital twin functions and services, digital twin functions and services can be easily searched for and utilized, and existing digital twin functions and services can be expanded or a new service can be generated by federating two or more digital twins.

Although the embodiments of the present disclosure have been described in detail above, the scope of the present disclosure is not limited thereto, and various modifications and improved forms by those skilled in the art using the basic concept of the present disclosure as defined in the following claims are also included to the scope of the present disclosure.

What is claimed is:

1. A method in an apparatus for a digital twin federation including a processor, the method comprising:
   registering, by the processor, digital twin information including functions and services of a first digital twin in a registry;
   registering, by the processor, connection information of the first digital twin to a connection broker;
   transmitting, by the processor, a request for searching digital twin information for digital twin federation to the registry;
   receiving, by the processor, an information search result including second digital twin information for the digital twin federation from the registry;
   transmitting, by the processor, a connection request for the digital twin federation to the connection broker;

receiving, by the processor, connection information of a second digital twin for the digital twin federation from the connection broker;

performing, by processor, connection establishment with the second digital twin using the connection information of the second digital twin for the digital twin federation; and providing, by the processor, a service through information exchange with the second digital twin;

wherein a function of the second digital twin is different from the function of the first digital twin.

2. The method of claim 1, further comprising:

searching, by the processor, digital twin information to be used from the registry; and changing or expanding, by the processor, digital twin functions and services or providing new services using the searched digital twin information.

3. The method of claim 1, wherein the method for digital twin federation is performed by a generative AI (Artificial Intelligence) or an autonomous system.

4. An apparatus for a digital twin federation for a first digital twin to federate with another digital twin, the apparatus comprising:

a registry that registers functions and services of the first digital twin in the registry;

a searcher that accesses a registry and searches other digital twins with a function or service to be federated;

a connector that registers connection information of the first digital twin to a connection broker, accesses the connection broker, receives connection information of the other digital twins with the function or service to be federated, and establishes a connection with the other digital twins; and a service provider that provides digital twin functions and services through information exchange with the connected other digital twins;

wherein a function provided by the other digital twin is different from a function provided by the first digital twin.

5. The apparatus of claim 4, wherein the searcher accesses the registry and searches for a digital twin function or service to be used, and the apparatus further comprising a manager that changes or expands digital twin functions and services or provides new services using the searched digital twin information.

* * * * *